United States Patent Office 2,810,000
Patented Oct. 15, 1957

2,810,000

METHOD FOR THE MONONITRATION OF P-CHLOROTOLUENE

Leslie M. Schenck, Westfield, N. J., assignor to General Aniline & Film Corporation, New York, N. Y., a corporation of Delaware No Drawing. Application December 13, 1955, Serial No. 552,717

6 Claims. (Cl. 260—646)

The present invention relates to an improved method of preparing 4-chloro-2-nitrotoluene and 4-chloro-3-nitrotoluene by the mononitration of p-chlorotoluene whereby a more favorable distribution of the two isomeric forms with a lower dinitro content is obtained.

Commercially, 4-chloro-2-nitrotoluene and 4-chloro-3-nitrotoluene are prepared by the nitration of p-chlorotoluene. The preparation of these compounds by this method has long been known to the art. Goldschmidt and Honig, Ber. 19, 2440, 2442 (1886) report the formation of 4-chloro-3-nitrotoluene, together with the isomer 4-chloro-2-nitrotoluene, by the nitration of p-chlorotoluene with nitric acid in the presence of sulfuric acid. During the same era, Beilstein and Kuhlberg, Ann. 158, 336, prepared 4-chloro-2-nitrotoluene by a replacement of the amino group with chlorine in 2-nitro-4-aminotoluene by diazotization, and Gatterman and Kaiser, Ber. 18, 2600 (1885) effected the formation of 4-chloro-3-nitrotoluene by the addition of sodium nitrite to a boiling mixture of 3-nitro-4-aminotoluene, cuprous chloride and hydrochloric acid, thereby replacing the amino group by halogen.

During later investigations, Gindraux, Helv. Chim. Acta 12, 921–34 (1929) studied the nitration of p-chlorotoluene under varying conditions, and reported that this nitration gives a product consisting of 53–62.5% 4-chloro-2-nitrotoluene, the remaining 37.5–47% being 4-chloro-3-nitrotoluene. In a comprehensive work on the nitration of p-chlorotoluene and p-bromotoluene, patterned on the study of the nitration of p-bromotoluene by Holleman, Rec. Trav. Chim. 34, 283 (1915), Shaw and Turner, J. Chem. Soc., 1884 (1932) obtained the following isomerides by nitrating 4-chlorotoluene with excess nitric acid at varying temperature conditions:

| Temp., °C. | Percent 4-chloro-2-nitrotoluene | Percent 4-chloro-3-nitrotoluene |
| --- | --- | --- |
| −15 | 64.4±0.2 | 35.6±0.2 |
| 0 | 62.0 | 38.0 |
| 0–50 | 58.8 | 41.2 |

Fry, J. Am. Chem. Soc. 38, 1327 (1916) obtained figures indicating 36.18% of the 3-nitroisomer.

Hodgson and Anderson, J. Chem. Soc. 125, 2195 (1924) confirmed earlier work of Holleman, Rec. Trav. Chim. 28, 408 (1909) finding 58 and 58.8%, respectively, of 4-chloro-2-nitrotoluene in comparison with Holleman's 58% by direct nitration over 45 minutes and 60 minutes with an excess of nitric acid. Using 5 parts sulfuric acid ($d=1.84$) with a 15% excess of nitric acid ($d=1.48$), these authors reported the 2 and 3 nitroisomers in the ratio of 64–65/36–35, with a solidification point (S. P.) of 14° C. Using a mixture of nitric acid, phosphoric oxide and acetic anhydride, a 50:50 isomer distribution was obtained.

A typical currently employed commercial process for the manufacture of 4-chloro-2-nitrotoluene and 4-chloro-3-nitrotoluene is described in B. I. O. S. 1145, p. 22. In this process, 3500 kilograms p-chlorotoluene, S. P. 6.8–7.0° C., is nitrated at 15–20° C. over a period of 4–5 hours by the addition of 5060 kilograms of a nitrating acid composed of 60% sulfuric acid, 35% nitric acid and 5% water. The crude nitration mixture is diluted with water, and the oil layer separated and washed with water and dilute soda ash solution. The crude product thereby obtained has the following specifications: S. P. 18–18.5, about 65% 4-chloro-2-nitrotoluene, about 35% 4-chloro-3-nitrotoluene, some dinitrochlorotoluene. The crude product is separated into its two major components by alternate fractional distillations and freezing operations until there is eventually obtained 4-chloro-2-nitrotoluene, S. P. 35.9, and 4-chloro-3-nitrotoluene, S. P. 6.2–6.3° C. There remains a 3–5% residue which is chiefly dinitro products, and is burned. A typical flow, based on the separation of o- and p-nitrochlorobenzene, is given in Groggins, Unit Processes in Organic Synthesis, McGraw Hill Book Co., N. Y., 1951, p. 71.

It is of extreme interest to note that in the commercial process the isomer ratio of 65/35 previously reported by Shaw and Turner, Hodgson and Anderson, and Fry, is attained. Since the 4-chloro-2-nitrotoluene, obtained in 65% yield, is the more commercially valuable of the two isomers, the utmost chemical endeavor is expended to insure its predominance. It is also of interest to note that B. I. O. S. mentions the formation of higher nitration products, which are concentrated through the processing of the crude nitration mixture to give a total residue of 3–5% consisting chiefly of dinitrochlorotoluenes. Since dinitro and higher nitrated aromatic compounds are known to be hazardous from an explosion aspect (see Sax, Handbook of Dangerous Material, Reinhold Publishing Company, 1951), it is readily understood that in the manufacture of mononitrated aromatics, where an eventual distillation step is required, great care must be exercised to reduce dinitration to an absolute minimum to insure safety in this operation. Groggins, loc. cit., p. 34, realizes this important fact and states: "In contradistinction to sulfonation, the nitrating temperature has comparatively no directive influence on the position taken by the entering —$NO_2$ group, but it is of importance in controlling the purity of the reaction product. With ascending temperatures, the degree of nitration is increased so that proportional amount of a higher nitrated product is formed. The deleterious influence that such impurities may exercise in subsequent operation is apparent."

Nitrations of p-chlorotoluene pursuant to the methods described in the foregoing literature produce 0.5–3% of higher nitration products, thereby decreasing the yield and purity of the product, as well as contributing to greater difficulty, expense and hazard in obtaining the separate isomers in their desired state of purity. For the processes described in prior art to be feasible, they must be operated at temperatures above the freezing point of the reactants and product, i. e. ca. 10–20° C., thereby contributing to the formation of undesirable higher nitration products.

Accordingly, it is an object of the present invention to provide an improved process of nitrating p-chlorotoluene to yield a more favorable isomer ratio with a lower dinitro content.

Other objects and advantages will become apparent from the following description.

I have discovered that by conducting the nitration of p-chlorotoluene to 4-chloro-2-nitro and 4-chloro-3-nitrotoluene at temperatures of −5° to 15° C., in the presence of an aliphatic dichloride containing from 2 to 4 carbon atoms, dinitro formation is reduced to very low limits hitherto unobtainable. From the teachings of the literature, one would anticipate a 65/35 distribution of isomers obtained during the nitration of p-chlorotoluene. Contrary to the prior art, the presence of the aliphatic dihalide, by some unexplained phenomena, and in a manner completely unanticipated, changes the ratio of isomer distribution from the previously reported 65/35% 2-nitro-3-nitro chlorotoluene ratio to a crude product of S. P. 22.8, with a corresponding isomer ratio of 72.5/27.5%, respectively. It is highly probable that the same unexpected factors observed in my experiments, which have contributed to the more favorable isomer ratio, also influence the abnormally low dinitration observed at higher temperatures.

In practicing the present invention a mixture consisting of 700 grams of p-chlorotoluene, having a solidification point of 6.8–7.0° C., and about 10% by weight of an aliphatic dihalide is cooled to a temperature ranging between —5° to 15° C. To the mixture is added, over a period of 4 to 12 hours, 924 grams of a nitrating acid mixture of 59–60% sulfuric acid, 34–36% nitric acid and 4–7% water. Other mixed acids of commerce may also be employed, including, for example, those containing 30% nitric acid, 60% sulfuric acid and 10% water; 33% nitric acid and 67% sulfuric acid; etc. Following the addition of the nitrating acid the mixture is maintained for 3 to 5 hours at —5° to 15° C. diluted with water, and the oil layer separated and washed with water, and diluted with soda ash solution. The crude product is separated into its two major components by alternate fractional distillations and freezing operations as given in Groggins, Unit Processes in Organic Synthesis, p. 71.

It is to be noted that all of the foregoing percentages and those in the following working examples, relating to the acids and water constituting the nitrating mixture, are on a weight basis.

As examples of aliphatic dihalides which may be employed, the following are illustrative:

Ethylene dichloride, propylene dichloride, trimethylene chloride, α-butylene dichloride, butylidene chloride, etc. It is to be noted that the nature or character of the aliphatic dihalide is immaterial so long as it is saturated and contains two chlorine atoms in the aliphatic chain. In addition to compounds of this type, I may also employ mono or polyhalogenated aliphatic hydrocarbons of 1 to 6 carbon chain length.

By the process of the present invention, a useful method is provided of producing crude mononitration isomers of p-chlorotoluene in a form more easily purified to the individual moieties than crude mixtures produced by the prior art methods. In addition, the process of the present invention eliminates the hazards concurrent with higher nitration inherent with methods of nitration of p-chlorbenzene as disclosed in the chemical literature. Moreover, the process of the present invention provides a method of obtaining a greater percentage of the more commercially desirable 4-chloro-2-nitrotoluene.

The following examples will illustrate the manner in which the present invention may be practiced.

It is to be understood, however, that these examples are not to be construed as being limitative, but are furnished merely for purposes of illustration.

Example I

A mixture of 700 grams (5.53 moles) of p-chlorotoluene and 87 grams (0.88 moles) of ethylene dichloride were cooled to —1 to 1.0° C. There was added, over a period of 12 hours, at —1 to 1.0° C. 924 grams of a mixed acid with the composition 59.8% sulfuric acid (5.53 moles), 34.7% nitric acid (5.09 moles) and 5.5% water. Following the addition of the nitric acid, the mixture was maintained for 4 hours at —1 to 1.0° C., diluted with 112 grams of water, and the crude chloronitrotoluene layer separated, washed with cold water, dilute sodium carbonate, and dried in vacuum to yield 95% of the theoretical weight of chloronitrotoluene having a solidification point of 23.1, a dinitro content of 0.18%, and an isomer ratio of 73/27%.

It is to be noted that the crude chloronitrotoluene layer after separation and washing with cold water may be further washed with any dilute aqueous alkali, such as potassium carbonate, sodium or potassium hydroxide, etc.

Example II

Example I was repeated with the exception that the operation was conducted at 12° C. The yield obtained was 95% of the theoretical weight of chloronitrotoluene having a solidification point of 21.50° C., a dinitro content of 0.20% and an isomer ratio of 70/30%.

Example III

Example I was again repeated with the exception that 924 grams of the mixed nitrating acid were replaced by 972 grams of a nitrating acid of the composition 35.1% nitric acid (5.42 moles), 59.8% sulfuric acid (5.94 moles) and 5.1% of water. The yield obtained was 95% of the theoretical weight of chloronitrotoluene, with a solidification point of 20.4° C., a dinitro content of 0.15% and an isomer ratio of 69.5/30.5.

Example IV

Example I was again repeated with the exception that 924 grams of the mixed nitrating acid employed in Example I were replaced by 1131 grams of a nitrating acid of the composition 60% sulfuric acid, 30% nitric acid and 10% water. The yield obtained was 94.5% of the theoretical weight of chloronitrotoluene, with a solidification point of 21.1° C., a dinitro content of 0.16%, and an isomer ratio of 69.8/30.2.

I claim:

1. The process of preparing 4-chloronitrotoluenes which comprises cooling a mixture of p-chlorotoluene in the presence of about 10% by weight of a saturated aliphatic dichloride containing from 2 to 4 carbon atoms to a temperature of —5° to 15° C., adding to the cooled mixture a nitrating acid consisting of 59–60% by weight of sulfuric acid, 34–36% by weight of nitric acid, and 4–7% by weight of water, and maintaining the resulting mixture at the said temperature for a period of time ranging from 3–5 hours, followed by dilution with water, separating the crude 4-chloronitrotoluene layer and washing it with water and dilute aqueous solution of an inorganic alkali, and then collecting and drying the 4-chloronitrotoluenes.

2. The process according to claim 1 wherein the aliphatic dihalide is ethylene dichloride.

3. The process according to claim 1 wherein the aliphatic dihalide is propylene dichloride.

4. The process according to claim 1 wherein the aliphatic dihalide is trimethylene chloride.

5. The process according to claim 1 wherein the aliphatic dihalide is α-butylene dichloride.

6. The process according to claim 1 wherein the aliphatic dihalide is butylidene chloride.

No references cited.